United States Patent
Allingham

(12) 
(10) Patent No.: US 6,473,826 B1
(45) Date of Patent: Oct. 29, 2002

(54) PCI DELAYED TRANSACTION TIME OUT COUNTER AND ASSOCIATED METHODS

(75) Inventor: Donald N. Allingham, Ft. Collins, CO (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/295,051

(22) Filed: Apr. 20, 1999

(51) Int. Cl.[7] .......................... G06F 13/36; G06F 13/14
(52) U.S. Cl. ...................................... 710/310; 710/314
(58) Field of Search .............................. 710/305–315, 710/36, 39

(56) References Cited

U.S. PATENT DOCUMENTS

| | | | | |
|---|---|---|---|---|
| 3,936,801 A | * | 2/1976 | Shuman | 340/825.74 |
| 4,206,346 A | * | 6/1980 | Hirosawa et al. | 714/814 |
| 5,557,548 A | * | 9/1996 | Gover et al. | 702/176 |
| 5,870,567 A | * | 2/1999 | Hausauer et al. | 710/101 |
| 5,983,304 A | * | 11/1999 | Jin | 710/129 |
| 5,987,555 A | * | 11/1999 | Alzien et al. | 710/129 |

OTHER PUBLICATIONS

PCI Local Bus Specification, Revision 2.1s, Jun. 1, 1995, pp. 49–55.*

* cited by examiner

*Primary Examiner*—Sumati Lefkowitz
(74) *Attorney, Agent, or Firm*—Patton Boggs LLP

(57) ABSTRACT

The invention provides for clearing a delayed transaction buffer associated with master-to-slave transactions on a PCI bus. In a slave such as a PCI bridge chip, or in other slave VLSI devices on the PCI bus, one or more delayed transaction buffers are used to store delayed transaction data to improve bus performance when the master retries a past transaction. A counter section counts time via clock cycles following receipt of a delayed transaction within each buffer. After a preselected time period, the buffer is flushed so that other delayed transaction data can be stored within the buffer. In the preferred embodiment, a free running n-bit counter and a plurality m-bit time out counters are used to provide the "time out" feature of the invention. Each time out counter generates a flush signal which deletes delayed transaction information stored within the associated buffer after the preselected time out period. The time out counters are reset to "zero" after receipt of a delayed transaction by the associated delayed transaction buffer.

22 Claims, 3 Drawing Sheets

PCI DELAYED TRANSACTION TIME OUT COUNTER AND ASSOCIATED METHODS

BACKGROUND OF THE INVENTION

PCI stands for "peripheral component interface" defined by the PCI Special Interest Group in an effort to stem development of various local bus architectures. PCI bus communications include transactions between "master" and "slave" devices connected to the bus. The prior art is familiar with PCI bus architectures and master-slave communication protocols.

To enhance PCI bus performance, a "delayed transaction" is implemented when a master initiates a transaction to a slave that cannot immediately respond. Delayed transactions are used to improve bus performance. Specifically, in a delayed transaction, a slave captures the transaction request information—e.g., address, command, byte enable and data—and prompts the master to retry the cycle at a later time. The slave then proceeds to execute the transaction and stores the resulting information. When the master attempts the cycle again, the slave has the data that is needed and completes the transaction.

By way of example, the prior art is familiar with PCI bridge chips that connect together two PCI buses. These bridge chips can be used, for example, in transferring data from an initiating PCI bus to a target PCI bus. One prior art bridge chip is the DEC21154 chip from Intel, for example. These prior art bridge chips generally provide for sequential transfer of large bursts of data across the bridge. In the case of a delayed transaction from a PCI to a PCI bridge, the slave executes the delayed transaction on the target or secondary bus.

A problem occurs in prior art PCI delayed transaction architecture when an initiating master does not retry a cycle that was previously categorized as a delayed transaction. Without a way to clear the cycle information captured by the slave, a deadlock can occur: the slave waits for the initiating master to return and refuses to accept new cycles. This problem is detailed in FIG. 1, illustrating a master 10 attempting communication from a primary PCI bus P1 to a secondary PCI bus P2, and ultimately to SCSI device 12. The bridge chip 14 serves as a slave for the transactions issued by the master 10. In early PCI bus protocol, if the master 10 initiates a read on PCI bus P1 and the target PCI bus P2 cannot respond, the PCI bus P1 could actually lock until the target bus P2 responds. With delayed transaction PCI architecture, if the target device bus P2 cannot respond to the master-initiated read, a retry is issued in a delayed transaction at the bridge chip 14 and the primary bus P1 remains free for other transactions. However, the bridge chip 14 has a finite number of delayed transaction buffers, shown in FIG. 2.

FIG. 2 shows prior art slave delayed transaction buffers 16 such as used in the bridge chip 14 of FIG. 1. FIG. 2 also illustrates representative data 18 (e.g., the transaction request information) associated with the buffers 16. In the event that the master 10 does not retry the transaction associated with the data 18, then other buffers 16 are used for storage—until all buffers 16 are used and full, thereafter locking delayed transaction data 18 within the buffer 16. In such a situation, the target device—i.e., the bridge chip 14 in this example—waits for the initiating master to return and refuses to accept new cycles, locking out transactions between the master and, for example, the SCSI device 12.

One object of the invention thus provides delayed transaction architecture which solves the aforementioned problem. Another object of the invention is to provide a PCI bridge chip that controls delayed transaction buffers to prevent delayed transaction lockout as described in FIGS. 1 and 2. Yet another object of the invention is to provide delayed transaction buffers and counters as improvements to PCI target devices utilizing delayed transactions.

These and other objects will become apparent in the description that follows.

SUMMARY OF THE INVENTION

As used herein, "VLSI" stands for very large integration integrated circuits. VLSI designation is made for convenience only with respect to integrated circuits of the invention and can include ultra large scale integration ("ULSI") devices.

In one aspect, the invention provides an efficient implementation of a low cost PCI delayed transaction time out counter. Such a delayed transaction counter of the invention includes delayed transaction buffers of a slave coupled to a master on a PCI bus. In one aspect, the counter includes a free running n-bit counter and a plurality m-bit time out counters coupled to the free running n-bit counter. Each time out counter couples to an associated delayed transaction buffer of the slave; and each time out counter generates a flush signal which deletes delayed transaction information stored within the associated buffer after a time out period. Each time out counter is thereafter reset to zero after receipt of a delayed transaction by the associated delayed transaction buffer.

In another aspect, there includes means, such as an AND gate, for incrementing each time out counter by one.

In one aspect, the counter includes means, such as an AND gate, for restarting each time out counter after a PCI delayed transaction.

In other aspects, the n-bit counter is implemented as an 8-bit counter or a 6-bit counter; and the m-bit counter is implemented as an 8-bit counter or a 10-bit counter.

In yet another aspect, the invention provides improvements to a slave device of the type which stores delayed transactions from a master on a PCI bus. The improvement includes a free running n-bit counter and a plurality m-bit time out counters coupled to the free running n-bit counter. Each time out counter couples to an associated delayed transaction buffer of the slave, and each time out counter generates a flush signal which deletes delayed transaction information stored within the associated buffer after a time out period. Each time out counter is reset to zero after receipt of a delayed transaction by the associated delayed transaction buffer.

In another aspect, the invention provides a PCI VLSI device operating as a slave to a master on a PCI bus. A plurality of delayed transaction buffers store delayed transaction information data, the data being used by the slave in a subsequent retry by the master to complete a transaction on the bus. A counter section times a time period for which the data is stored within each of the buffers. Each of the buffers is flushed when the time period exceeds a preselected time out period.

In one aspect, the counter section of this aspect includes a free running n-bit counter and a plurality m-bit time out counters coupled to the free running n-bit counter. Each time out counter couples to an associated delayed transaction buffer of the slave, and each time out counter generates a flush signal used by the device to delete delayed transaction information stored within the associated buffer after the time out period.

In other aspects, the invention includes means for resetting each time out counter to zero after receipt of a delayed transaction by the associated delayed transaction buffer, and/or means for incrementing each time out counter by one. A PCI VLSI device of the invention can include a 16-bit counter for each delayed transaction buffer such that delayed transactions are flushed from the buffer within $2^{15}$ clock cycles.

In yet another aspect, the invention includes a method for clearing a delayed transaction buffer associated with master-to-slave transactions on a PCI bus, including the steps of: counting time via clock cycles following receipt of a delayed transaction within the buffer; and flushing the buffer after the time exceeds a preselected limit.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
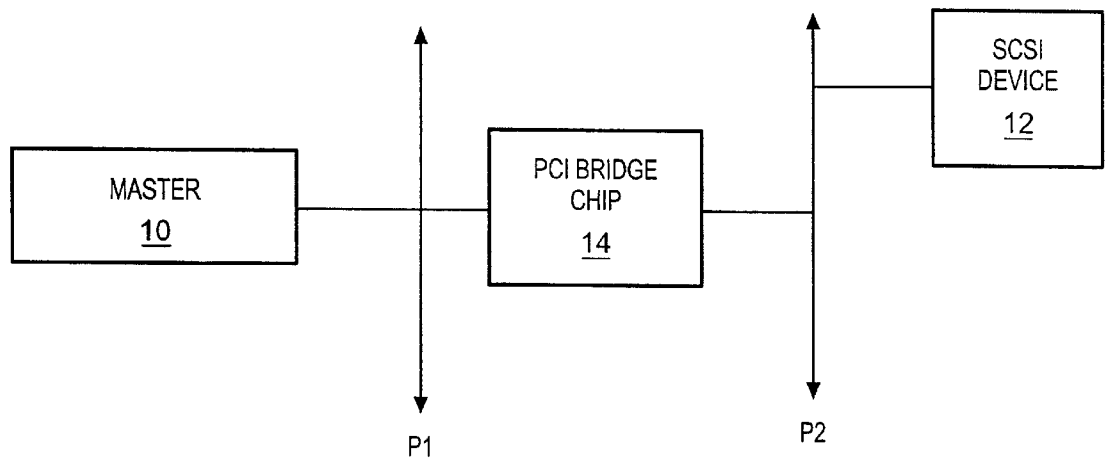
FIGS. 1 and 2 illustrate prior art delayed transaction architecture and methods.
Figure 2:
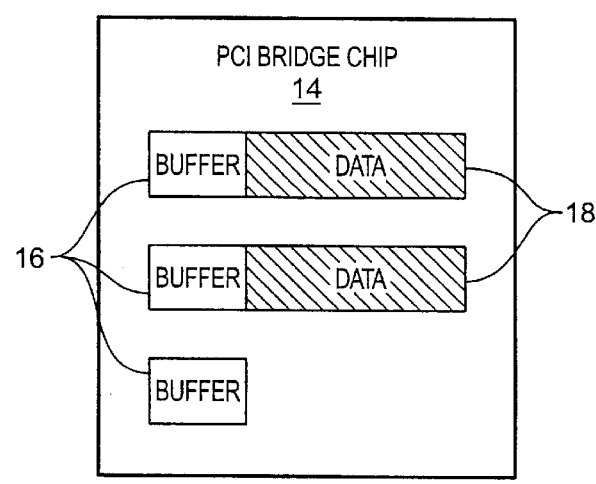
Figure 3:
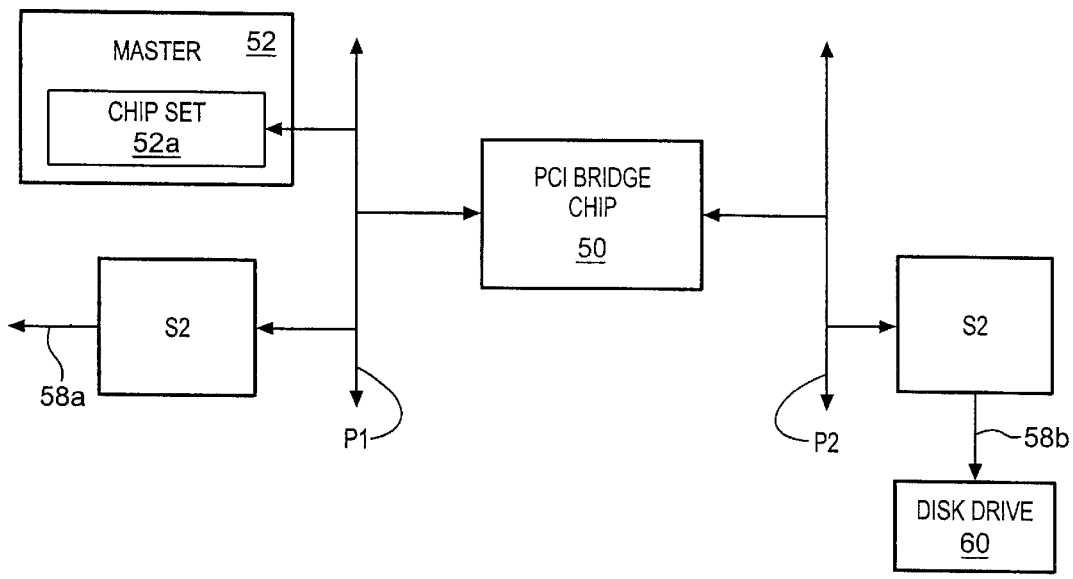
FIG. 3 schematically illustrates master-slave PCI transaction architecture constructed according to the invention.

FIG. 3 shows a PCI bridge chip 50 implementing delayed transaction architecture according to the invention and connected between two PCI buses P1 and P2. As known in the art, a master 52 (e.g., a central processing computer board with a Pentium microprocessor) can connect to the PCI bus P1 through its support chip set 52a, as shown. One exemplary chip set 52a, for example, is the Intel 440LX chip set.

Various devices can also connect to the PCI buses P1, P2. By way of example, devices S1 and S2 connect, respectively, to PCI bus P1 and P2 and the chip set 52a can drive the devices S1 and S2 across the buses P1, P2. Devices S1, S2 can for example be SCSI or Fibre Channel chips which interface to a storage bus 58 (typically either SCSI or Fibre Channel), as shown. Storage devices typically connect to SCSI buses 58, as illustrated by disk drive 60 connected to device S2 on SCSI bus 58b. In a typical example, the host CPU 52 issues a write command to the device S2 over PCI buses P1 and P2 through bridge chip 50.

Figure 4:
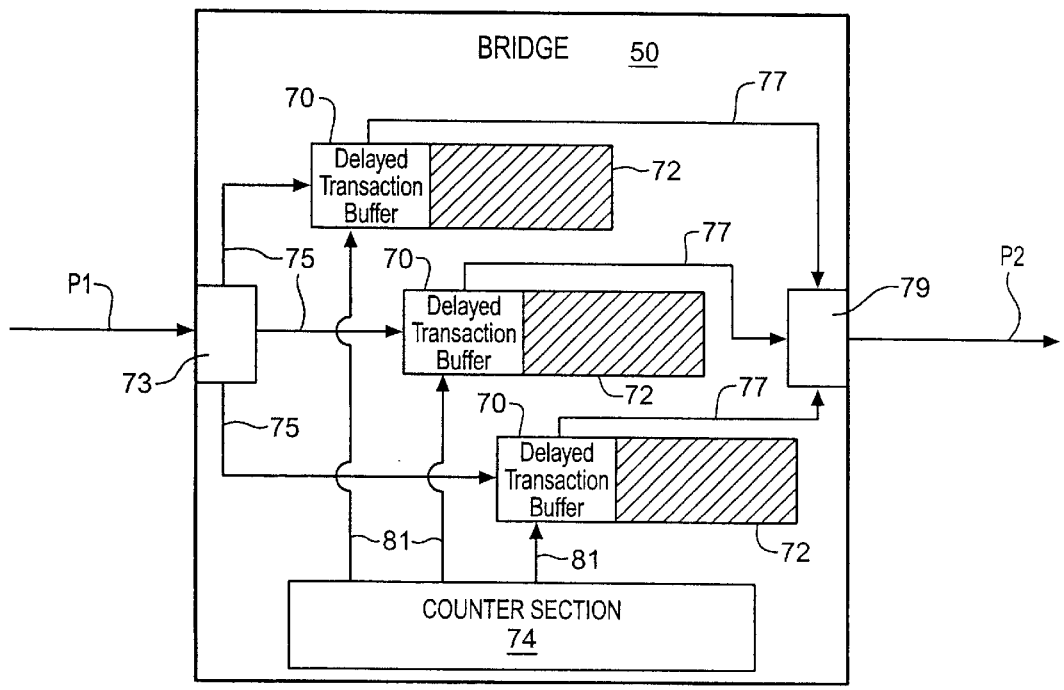
FIG. 4 shows further detail of delayed transaction architecture in the bridge chip of FIG. 3.

In operation, PCI bridge chip 50 transfers data and commands between bus P1 and bus P2. As shown in FIG. 4, PCI bridge chip 50 stores delayed transaction information in a series of delayed transaction buffers 70. Those skilled in the art should appreciate that other architecture sufficient to make the PCI bridge chip 50 operable is not shown for clarity of illustration; and that such other architecture is known in the art and present within PCI bridge chip 50.

More particularly, FIG. 4 shows three delayed transaction buffers 70, within chip 50, which store delayed transaction information data 72, as needed and described above to improve PCI bus communication. Data stored in buffers 70 from PCI bus P1 is parsed to respective buffers 70 via the PCI bridge chip interface 73 and along data paths 75. Chip 50 includes a counter section 74 which times out delayed transaction information data 72 that is not re-tried by the master within a selected period of time. Specifically, a time out is separately applied to each buffer 70 through data paths 81; and in the event that a delayed transaction is not re-tried within a selected time period (e.g., defined by clock cycles), the relevant transaction data 72 is flushed from that buffer 70. The chip 50 executes the cycle on bus P2 through paths 77 and interface 79. If the transaction is re-tried within the selected time period after the cycle has executed onto P2, chip 50 implements the transaction onto PCI bus P1 through the data paths 75 and PCI chip interface 73. Further detail of these operations are described in connection with FIG. 5, for example with regard to the "flush" signal.

In one embodiment, if a delayed transaction is not re-tried within $2^{15}$ clocks, the timed transaction is flushed from the buffer 70. According, counter section 74 of one embodiment utilizes a 16-bit counter for every outstanding delayed transaction that is handled by the target chip 50. More particularly, counter section 74 can include one 16-bit counter for each buffer 70.

However the use of several 16-bit counters can add significant product cost to a chip utilizing delayed transaction architecture of the invention. Such counters also require relatively large areas in the available VLSI real estate (i.e., the available space area on the silicon chip). One arrangement, for example, includes ten 16-bit counters, six for transaction buffers (e.g., three buffers 70 for each direction between PCI buses P1, P2, FIG. 4), and four for data buffers (not shown). Ten 16-bit counters, though possible, require significant space and cost for a silicon chip.

Accordingly, the preferred embodiment of the invention reduces product cost by sharing major portions of each time out counter, as shown and described in connection with FIG. 5, through use of a free running 8-bit counter.

Figure 5:
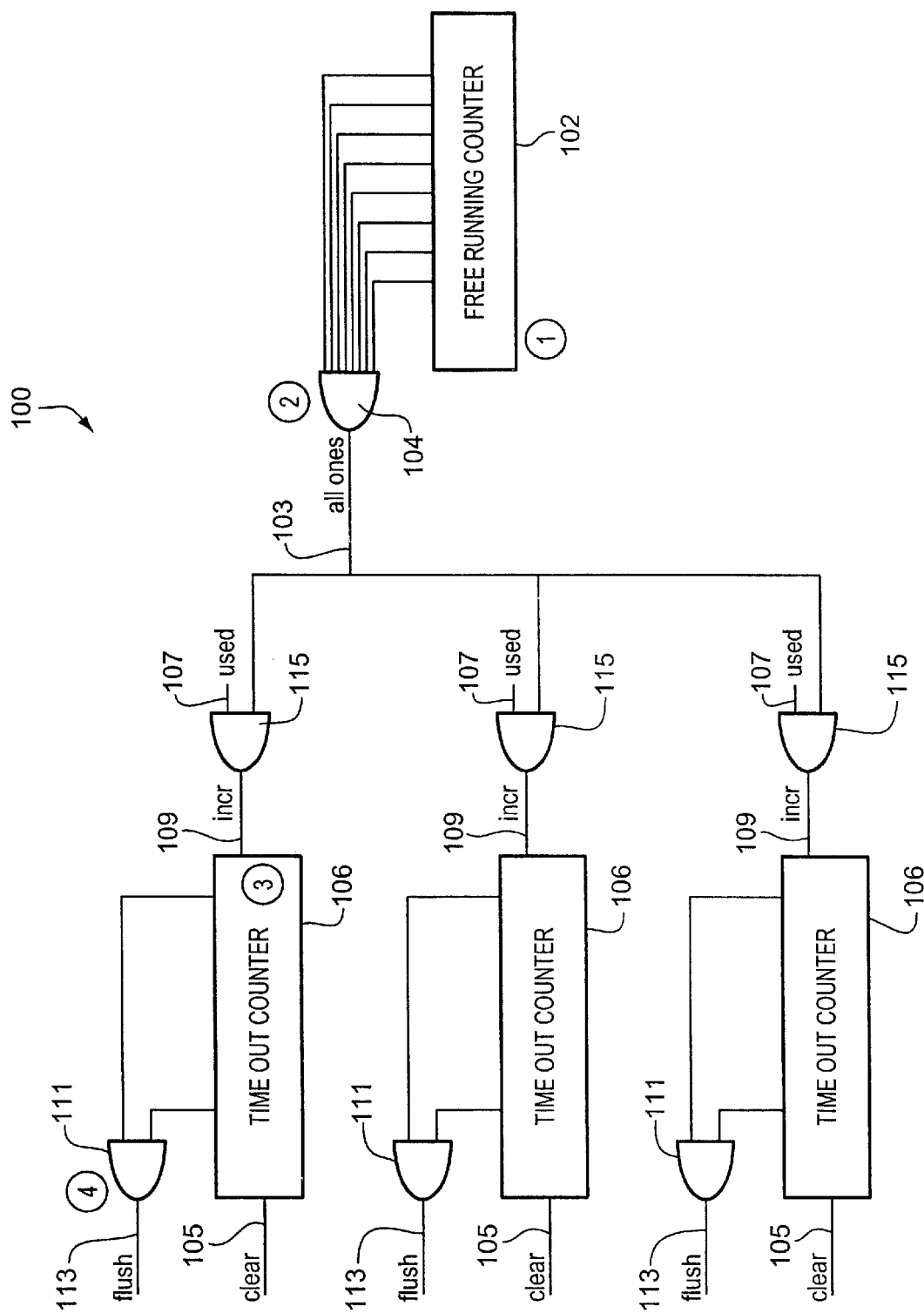
FIG. 5 shows a time out counter architecture constructed according to the invention and suitable for use with the PCI bridge counter of FIG. 4.

FIG. 5 shows counter architecture 100 suitable for use with the counter section 74 of FIG. 4. A free running counter 102 provides a continuous count for the architecture 100. When the counter 102 reaches its maximum value (a series of ones), an "all_ones" signal 103 is asserted by performing a logical AND 104 on all the bits. The counter 102 then rolls over back to zero, and continues counting. When a new delayed transaction is received within a buffer (e.g., data 72 within a buffer 70, FIG. 4), a "clear" signal 105 is asserted, for the corresponding time out counter 106, to reset that counter 106 back to zero. Once reset, a "used" signal 107 for that transaction is asserted and held high until the transaction is completed.

Each time the "all_ones" signal 103 is asserted in conjunction with the "used" signal 107, through AND 115, the "incr" signal 109 is asserted to the corresponding time out counter 106, causing the counter 106 to increment by one. When the upper bit and lower bits of the time out counter 106 are both one, a time-out is assumed, and the logical AND 111 of the two signals results with an assertion of the "flush" signal 113. The flush signal 113 indicates that the time out for the corresponding transaction has expired, and the command should be flushed to permit loading of another delayed transaction (e.g., information data 72, FIG. 4).

If a cycle completes before the timer expires, the "used" signal 107 is deasserted, and the associated counter 106 stops counting.

In the preferred embodiment, the free running counter 102 is an 8-bit counter, and each time out counter 106 is an 8-bit counter. The dynamic range of such an implementation means that a flush signal 113 will not be asserted after expiration of exactly $2^{15}$ clocks, as compared to utilizing a separate 16-bit counter. Because the value in the free running counter can be any value between 0 and $2^8$ when the delayed transaction is stored in a buffer, and the corresponding time out counter 106 is cleared, there is a range of time during which the timer may expire.

By performing a logical AND of the upper and the lower bits of the time out counter 106, it can however be guaranteed that time out for that associated transaction will expire between $2^{15}$ and 1 clocks (if the free running counter 102 is all ones when the time out counter 106 is cleared) and $2^{15}+2^8+1$ clocks (if the initial value of the free running counter 102 is 0 when the time out counter 106 is cleared). The range provided by this 8-bit arrangement is thus still sufficient to flush the delayed transaction within a reasonable time, the difference being less than 1% from the ideal 16-bit scheme, i.e., $(2^8+1)/(2^{15})=0.00784$; and this is achieved without use of ten 16-bit counters.

The counter architecture of FIG. 5 can also be replaced with ten 6-bit counters and a 10-bit free running counter. Errors are still less than 1% from idealized 16-bit counters. Other schemes are of course possible within the scope of the invention.

Note that the layout of FIG. 4 is illustrative and should not be considered limiting. Specifically, more or fewer transaction buffers can be used. In addition, typically certain buffers 70 (usually three) are assigned to transactions from bus P1 to bus P2 and other buffers 70 (usually three) are assigned to transactions from bus P2 to bus P1. Further, although the delayed transaction architecture is shown with respect to a PCI bridge chip 50; those skilled in the art should appreciate that similar delayed transaction architecture, including counters such as shown in FIG. 5, is also conveniently applied to other PCI target or slave devices. Accordingly, the use of delayed transaction architecture of the invention should not be considered as limited to PCI bridge chips, though such devices certainly illustrate one suitable use of the invention.

Those skilled in the art should appreciate that the implementation of the invention is not limited to PCI bridge chips, though such chips are used above to illustrate certain uses, advantages and embodiments of the invention.

The invention thus attains the objects set forth above, among those apparent from preceding description. Since certain changes may be made in the above systems and methods without departing from the scope of the invention, it is intended that all matter contained in the above description or shown in the accompanying drawing be interpreted as illustrative and not in a limiting sense.

In view of the foregoing, what is claimed is:

1. A delayed transaction counter for use with delayed transaction buffers of a slave coupled to a master on a PCI bus, comprising:
   a free running n-bit counter,
   a plurality of m-bit time out counters coupled to the free running n-bit counter, each time out counter coupled to an associated delayed transaction buffer of the slave, the free running counter selectively incrementing each time out counter, each time out counter generating a flush signal which deletes the delayed transaction information stored within the associated delayed transaction buffer after a time out period; and
   means for resetting each time out counter to zero after receipt of a delayed transaction by the associated delayed transaction buffer.

2. A counter according to claim 1, further comprising means for incrementing each time out counter by one.

3. A counter according to claim 2, wherein the means for incrementing comprises an AND gate.

4. A counter according to claim 1, further comprising means for restarting each time out counter after a PCI delayed transaction.

5. A counter according to claim 4, wherein the means for restarting comprises an AND gate.

6. A counter according to claim 1, wherein the n-bit counter comprises an 8-bit counter.

7. A counter according to claim 1, wherein the n-bit counter comprises a 6-bit counter.

8. A counter according to claim 1, wherein the m-bit counter comprises an 8-bit counter.

9. A counter according to claim 1, wherein the m-bit counter comprises a 10-bit counter.

10. In a slave device of the type which stores delayed transactions from a master on a PCI bus, the improvement comprising:
    a free running n-bit counter;
    a plurality of m-bit time out counters coupled to the free running n-bit counter, each time out counter coupled to an associated delayed transaction buffer of the slave, the free running counter selectively incrementing each time out counter, each time out counter generating a flush signal which deletes the delayed transaction information stored within the associated delayed transaction buffer after a time out period; and
    means for resetting each time out counter to zero after receipt of a delayed transaction by the associated delayed transaction buffer.

11. A PCI VLSI device operating as a slave to a master on a PCI bus, comprising:
    a plurality of delayed transaction buffers for storing delayed transaction information data, the data being used by the slave in a subsequent retry by the master to complete a transaction on the bus;
    a counter section for timing a time period for which the data is stored within each of the buffers, said counter section comprising a time out counter associated with each said buffer and a free running counter, said free running counter linked to each said time out counter; and
    means for flushing each of the buffers when the time period exceeds a preselected time out period.

12. A VLSI device according to claim 11, further comprising means for resetting each time out counter to zero after receipt of a delayed transaction by the associated delayed transaction buffer.

13. A VLSI device according to claim 11, further comprising means for incrementing each time out counter by one.

14. A VLSI device according to claim 13, wherein the means for incrementing comprises an AND gate.

15. A VLSI device according to claim 11, further comprising means for restarting each time out counter after a PCI delayed transaction.

16. A VLSI device according to claim 15, wherein the means for restarting comprises an AND gate.

17. A VLSI device according to claim 11, wherein the free running counter comprises an 8-bit counter.

18. A VLSI device according to claim 11, wherein the time out counter comprises an 8-bit counter.

19. A VLSI device according to claim 11, wherein the counter section comprises a 16-bit counter for each delayed transaction buffer such that delayed transactions are flushed from the buffer within $2^{15}$ clock cycles.

20. A VLSI device according to claim 11, further comprising means for operating the device as a PCI bridge chip.

21. A method for clearing a plurality of delayed transaction buffers associated with master-to-slave transactions on a PCI bus, comprising the steps of:

providing a time out counter coupled to each of the plurality of buffers;

providing a free running counter, the free running counter coupled to each time out counter:

following receipt of a delayed transaction within one of the plurality of the buffers, counting time in the time out counter coupled to the one of the plurality or buffers via clock cycles of the free running counter; and flushing the one of the plurality of buffers after the time in the time out counter exceeds a pre-selected limit.

22. A method of claim 21, wherein the step of counting time comprises the step of utilizing one or more 8-bit counters.

* * * * *